April 17, 1962 O. H. SCHADE, SR 3,030,440

VERTICAL APERTURE CORRECTION

Filed Nov. 12, 1958 4 Sheets-Sheet 1

INVENTOR.
OTTO H. SCHADE

BY
[signature]
ATTORNEY

April 17, 1962 O. H. SCHADE, SR 3,030,440

VERTICAL APERTURE CORRECTION

Filed Nov. 12, 1958 4 Sheets-Sheet 2

INVENTOR.
OTTO H. SCHADE

BY

ATTORNEY

VERTICAL APERTURE CORRECTION

Filed Nov. 12, 1958 4 Sheets-Sheet 3

INVENTOR.
OTTO H. SCHADE
BY
[signature]
ATTORNEY

April 17, 1962 O. H. SCHADE, SR 3,030,440

VERTICAL APERTURE CORRECTION

Filed Nov. 12, 1958 4 Sheets-Sheet 4

INVENTOR.
OTTO H. SCHADE
BY
W. H. Sprague
ATTORNEY

United States Patent Office 3,030,440

Patented Apr. 17, 1962

3,030,440
VERTICAL APERTURE CORRECTION

Otto H. Schade, Sr., West Caldwell, N.J., assignor to Radio Corporation of America, a corporation of Delaware Filed Nov. 12, 1958, Ser. No. 773,439
4 Claims. (Cl. 178—6)

This invention relates to video signalling systems and video signal correction apparatus therefor and, more particularly, to apparatus for effecting aperture correction of video signals in a direction perpendicular to the scanning lines. In view of the usual horizontal orientation of the scanning lines in the rasters of the scanning devices in a video signalling system, such correction is conventionally referred to as "vertical" aperture correction.

For background information of aid in appreciating the theory underlying the instant invention and for a detailed explanation of the meaning of a number of the terms used in the subsequent description, attention is directed to the series of articles published in the Journal of the Society of Motion Picture and Television Engineers under the title "Image Gradation, Graininess and Sharpness in Television and Motion Picture Systems," and written by the present inventor. Part I of the series, subtitled "Image Structure and Transfer Characteristics" was published in the aforesaid journal in February 1951 on pages 137–171; Part II, "The Grain Structure of Motion Picture Images—and Analysis of Deviations and Fluctuations of the Sample Number" in March 1952, pages 181–222; Part III, "The Grain Structure of Television Images," in August 1953, pages 97–164; and Part IV, A and B, "Image Analysis in Photographic and Television Systems (Definition and Sharpness)," in November 1955, pages 593–617.

As demonstrated in part III of the aforementioned series of articles, any raster process is in principle a sampling operation. Thus, for example, a vertical line in the image being scanned by a pickup device is represented in the pickup device output by a series of successive samples thereof respectively generated at the intersection of each scanning line and the subject vertical line. As the article further points out, the sinewave spectra of the analyzing and synthesizing apertures (i.e. the scanning spots of the camera and the kinescope in a television system) should have a definite cutoff in the sampling direction at a television line-number $N=n_r$, where $n_r$ is the raster line-number, not only to eliminate a visible line structure, but also to completely eliminate spurious signals (i.e. serrations and beat patterns) which inherently result if such a cutoff is not effected. For the most efficient use of a given line-number spectrum, the amplitude response should be uniform up to the cutoff line-number. Expressing the requirement of such a rectangular spectrum in terms of the space-domain or time-domain, a scanning spot is required which reproduces a mathematical line (unit pulse) as a line having an intensity cross-section or "line-transmittance" defined by a $$\frac{\sin x}{x}$$

function.

The present invention is directed to vertical aperture correction apparatus for achieving two important objectives: (1) To limit the vertical sinewave spectrum of the pickup device to line-numbers smaller than the raster line-number $n_r$ to avoid spurious signal effects of the raster "sampling" process, and (2) to increase the amplitude response within these limits ($N<n_r$) beyond that otherwise obtained from the pickup device. The significance of these objectives is discussed above and in the aforementioned part III article.

In accordance with a recognition of the foregoing effects as the desired and the important objectives of vertical aperture correction and a thorough analysis of the processes required for achieving such objectives, apparatus in accordance with the present invention is significantly simplified, relative to that heretofore considered as theoretically required to accomplish vertical aperture correction, particularly with respect to the video signalling systems of the line interlace type, such as that required by present television broadcast standards. In accordance with particular embodiments of the subject invention, apparatus for achieving aperture correction in a video signalling system employing line interlace may be constructed utilizing delay devices of a readily attainable nature, such apparatus achieving the desired objectives of vertical aperture correction to a highly satisfactory degree. This is in contrast with the teachings of the prior art which indicated that vertical aperture correction in such a system required the use of delay devices having very much greater delay periods than those utilized in the subject invention, such devices being relatively impractical and/or complex and expensive.

The primary object of the present invention is thus to provide improved apparatus for correcting video signals.

A further object of the present invention is to provide improved means for effecting vertical aperture correction of video signals whereby improved response and elimination of spurious signals is obtained.

An additional object of the present invention is to provide apparatus for effecting vertical aperture correction in video signalling systems of the line interlace type whereby said apparatus is substantially simplified relative to that indicated as required by the teachings of the prior art.

Other objects and advantages of the instant invention will be readily appreciated by those skilled in the art after a reading of the following specification and an inspection of the accompanying drawings in which:

FIGURE 1 graphically illustrates sinewave spectrum representations of an uncorrected pickup device scanning spot, of an effective correcting spot, and of the resulting effective corrected spot;

Figure 1:
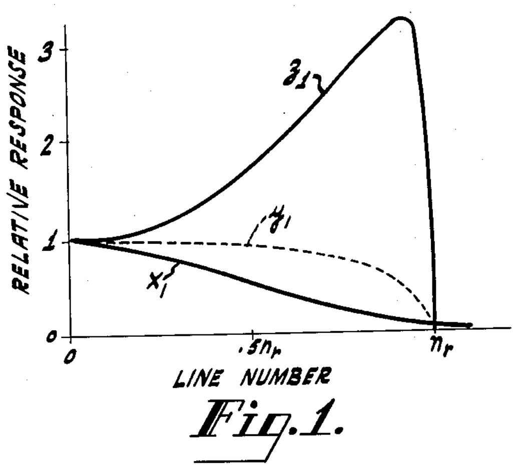

In FIGURE 1, the sinewave spectrum of the scanning spot of a typical camera tube, such as, for example, one of the well-known image orthicon type, is illustrated by the curve $x_1$. It will be seen from an inspection of the curve $x_1$ that the spectrum of the typical camera spot extends beyond a line-number equal to the raster line-number $n_r$. It will also be noted that the spectrum of the typical camera spot is not flat for the range of line-numbers up to the raster line-number $n_r$, but rather falls off appreciably over an extended portion of this range from the level of response attained at low line-numbers.

Curve $y_1$ in FIGURE 1, illustrates a desired spectrum. It will be noted that the response characteristic represented by curve $y_1$ drops to zero at the raster line-number $n_r$. It will also be noted that, in accordance with curve $y_1$, the "droop" exhibited in curve $x_1$ is avoided, and response is maintained at a level comparable to the level of response at low line-numbers over a much more extended range than curve $x_1$. Curve $z_1$ in FIGURE 1, illustrates the sinewave spectrum required of a "correcting spot" in cascade with the typical camera spot to achieve the corrected spectrum represented by curve $y_1$.

Figure 2:
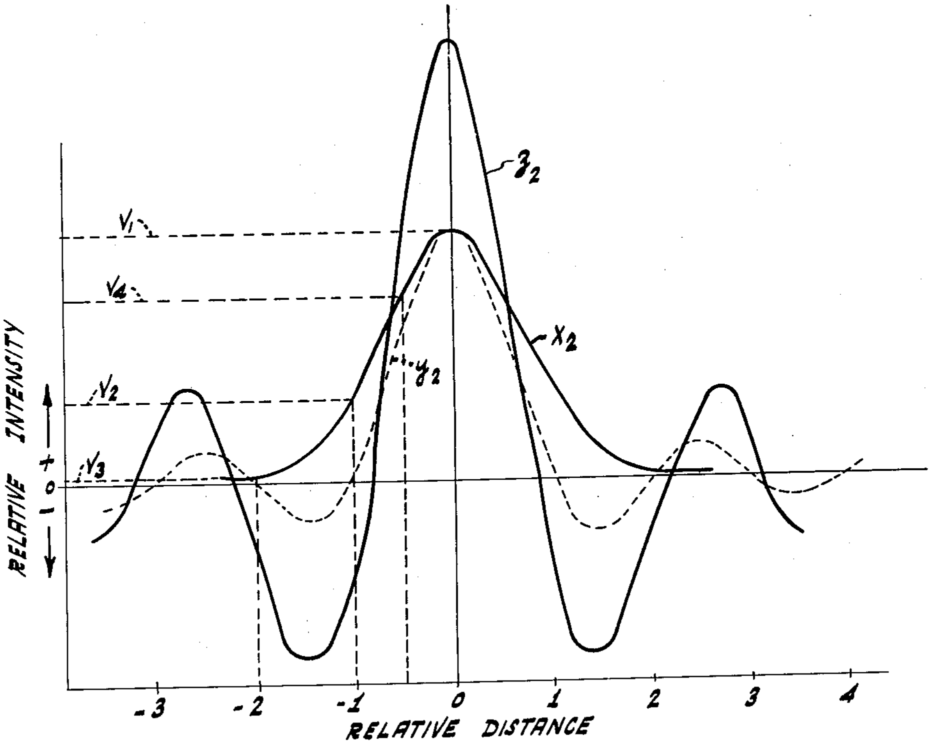
FIGURE 2 illustrates graphically representations of the aforementioned uncorrected, correcting, and corrected spots in the space- or time-domain.

To appreciate the manner in which one may provide a correcting spot spectrum of the type shown by curve $z_1$, it is believed to be helpful to now turn to a consideration of the problem presented and the result desired in terms of the time-domain or space-domain, in which analyses of scanning systems are more familiarly presented. Attention is therefore directed to the curves of FIGURE 2, in which the typical camera spot, the desired corrected spot, and the correcting spot required to achieve the latter are represented in the space-domain or time-domain. Curve $x_2$ is representative of the typical camera spot, such as one provided by a camera of the well-known orthicon variety.

This curve may be viewed as a locus of the relative values of response achieved by scanning with a typical camera spot a mathematical line lying in the horizontal direction in a succession of vertical shifted positions relative to the scanning line upon which the scanning spot is centered. To illustrate this point of view, $v_1$ represents the response obtained when the line to be reproduced is centered on the scanning line being scanned (i.e. the scanning line upon which the camera spot is centered). On the other hand, $v_2$ is representative of the relative level of response obtained when the line to be reproduced is centered on a scanning line immediately adjacent to the line being scanned; similarly, $v_3$ is representative of the relative level of response when the line to be reproduced is centered on a scanning line two lines away from the scanning line being scanned. The value $v_4$ is representative of the relative level of response obtained when the line to be reproduced is positioned half way between the center of the line of the scanning line being scanned and the center of an immediately adjacent scanning line. With the foregoing particular examples in mind, it is believed that one may now readily appreciate that curve $x_2$ thus represents a continuous graph of the successive signal values that would be obtained during successive scannings of a given line of a scanning raster if a horizontal line in the image being scanned slowly drifted vertically from a position several scanning lines above the given scanning line to a position several lines below the given scanning line.

Curve $z_2$ is representative of the form of a desired correcting spot, which, if effectively cascaded with respect to the typical camera spot represented by curve $x_2$, will provide a resultant corrected spot as represented by the curve $y_2$. Curve $y_2$ approximates the ideal $$\frac{\sin x}{x}$$

function.

Figure 3:
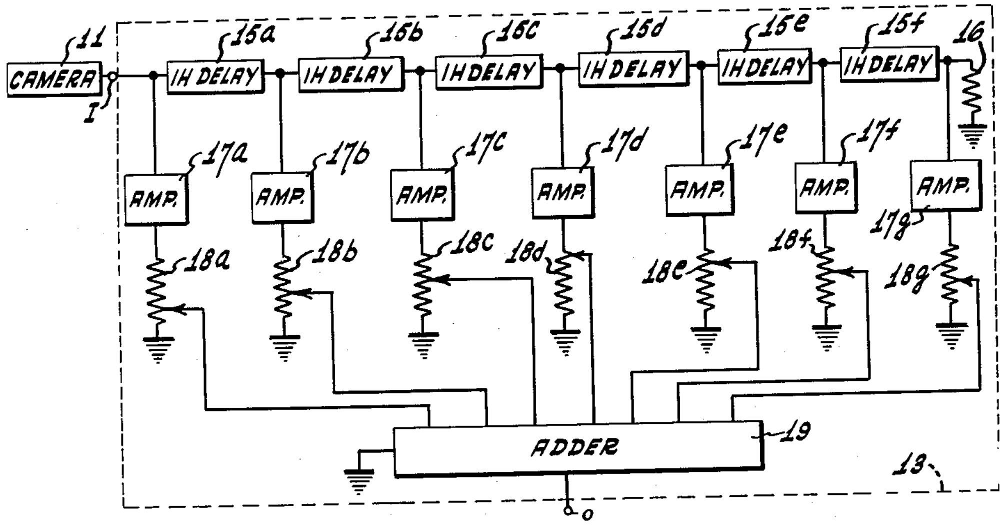
FIGURE 3 illustrates in block and schematic form vertical aperture correction apparatus in accordance with an embodiment of the instant invention.

FIGURE 3 illustrates apparatus in accordance with an embodiment of the present invention for effectively introducing a correcting spot as represented by curve $z_2$. As shown in FIGURE 3, the output of a camera 11, which may for example be of the well known image orthicon type, having a camera spot as represented by curve $x_2$, is applied to the input terminal I of correcting apparatus 13. The correcting apparatus 13 includes a plurality of delay lines 15*a*, 15*b*, 15*c*, 15*d*, 15*e*, and 15*f* which are connected in series in the order named between the input terminal I and a line termination represented by resistor 16, which is connected between the output terminal of the last delay line 15*f* and a point of fixed reference potential, and which matches the surge impedance of the delay line series. The input to each of the delay lines and to the resistor 16 is also applied to the input of a respective one of a group of amplifiers 17*a*, 17*b*, 17*c*, 17*d*, 17*e*, 17*f* and 17*g*. The output of each of the amplifiers is applied to a common adder network 19 via a respective one of the group of gain control potentiometers 18*a*, 18*b*, 18*c*, 18*d*, 18*e*, 18*f*, and 18*g*. Each of the delay lines 15*a*, 15*b*, etc. provides a single delay of a duration corresponding to the duration of a horizontal scanning period, i.e. approximately 63.5 microseconds. The respective amplifiers 17*a*, 17*b*, etc. are constructed such as to permit the achievement of phase inversion of the signal input thereto if desired. The output of adder 19 is applied to the output terminal O of the correcting apparatus 13. Adjustment of the variable taps on the potentiometers 18*a*, 18*b*, etc. permits adjustment of the relative contributions of the respective amplifiers 17*a*, 17*b*, etc. to the common adder 19 output appearing at output terminal O.

Figure 4:
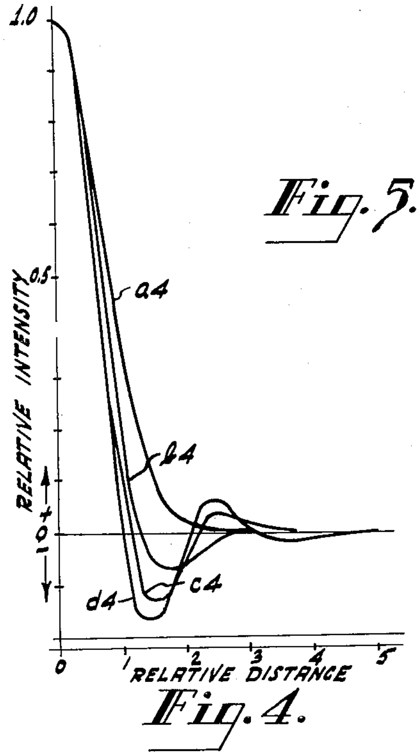
FIGURE 4 illustrates graphically the forms of corrected spots achieved by selected sets of parameter adjustments in the correcting apparatus of FIGURE 3 for signals derived in a sequential type scanning system.
Figure 5:
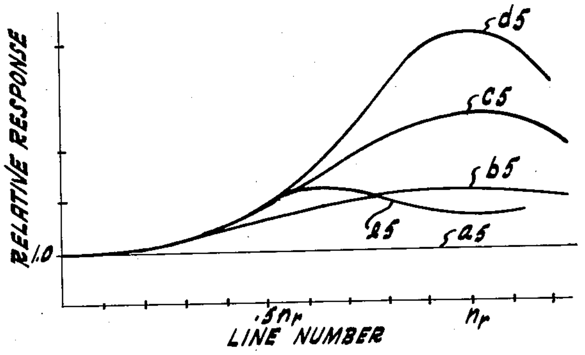
FIGURES 5 and 6 illustrate graphically the correcting spot sine-wave spectra and the corrected spot sine-wave spectra respectively, which are associated with the corrected spot forms illustrated in FIGURE 4.
Figure 6:
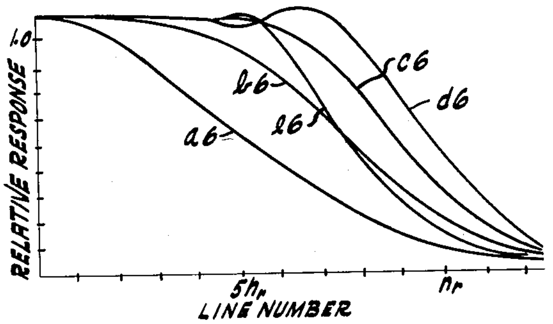

For the purposes of considering FIGURES 4, 5 and 6, now to be discussed, it will first be assumed that camera 11 utilizes a "sequential" scanning system, i.e., immediately adjacent raster lines are scanned in immediately adjacent periods of time.

In FIGURE 4, curve $a_4$ illustrates the form of the effective corrected spot provided by the correcting apparatus 13 of FIGURE 3, if it is assumed that amplifiers 17*a*, 17*b*, 17*c*, 17*e*, 17*f*, and 17*g* are disabled so that outputs appearing at terminal O correspond to the signals passed by amplifier 17*d* only. (i.e. curve $x_2$ corresponds to the uncorrected camera spot). Curve $b_4$ represents the corrected spot provided if the same camera spot assumption is made, but it is now assumed that only amplifiers 17*a*, 17*b*, 17*f*, and 17*g* are disabled, while amplifiers 17*c*, 17*d*, and 17*e* are operative to contribute to the output of adder 19. It is further assumed for purposes of curve $b_4$ that the amplifiers 17*c* and 17*e* provide output signals phase inverted relative to those provided by amplifier 17*d*, and potentiometers 18*c* and 18*e* are adjusted relative to the adjustment of potentiometer 18*d* to provide such that the contributions of amplifiers 17*c* and 17*e* to the output of adder 19 are reduced to be 19.0% of the contribution of amplifier 17*d* thereto.

Curve $c_4$ represents the corrected spot provided by the apparatus 13 with the same camera spot assumption, but with only amplifiers 17*a* and 17*g* rendered inoperative. The phase relationships of the contributions of amplifiers 17*c*, 17*d*, and 17*e* are as assumed above for curve $b_4$, but the amplitude relationships are altered by readjustments of potentiometers 18*c* and 18*e* such that the contributions of amplifiers 17*c* and 17*e* are now 32% of the amplifiers 17*d* contribution to the adder output. The amplifiers 17*d* and 17*f* provide signal outputs in phase with the signal output of the amplifier 17*d*, while the potentiometers 18*b* and 18*f* are adjusted relative to the adjustment of the potentiometer 18*d* such that the contributions of amplifiers 17*b* and 17*f* to the adder output are 6% of the contribution of amplifier 17*d* thereto.

Curve $d_4$ represents the corrected spot provided by apparatus 13 with the same camera spot assumption, but with all of the amplifiers 17*a*, 17*b*, 17*c*, 17*d*, 17*e*, 17*f* and 17*g* rendered operative. The phase relationships of the contributions of amplifiers 17*b*, 17*c*, 17*d*, 17*e*, and 17*f* to the output of adder 19 are as assumed above for curve $c_4$, but the amplitude relationships are altered by readjustments of potentiometers 18*b,* 18*c,* 18*e,* and 18*f* such that the contributions of the amplifiers 17*b,* 17*c,* 17*e,* and 17*f* are now 13%, 39.5%, 39.5%, and 13%, respectively, of the amplifier 17*d* contribution to the adder output. Amplifiers 17*a,* and 17*g* provide signal outputs which are phase inverted relative to the signal output of amplifier 17*d,* while potentiometers 18*a,* and 18*g* are adjusted relative to the adjustment of the potentiometer 18*d* such that the contributions of amplifiers 17*a* and 17*g* to the output of adder 19 are 3.2% of the contribution of amplifier 17*d* thereto.

In FIGURE 5, the sinewave spectra for the correcting spot which produce the corrected spot representations of curves $a_4$, $b_4$, $c_4$, and $d_4$ are represented by curves $a_5$, $b_5$, $c_5$, and $d_5$ respectively. The corresponding corrected spot sinewave spectra are shown in FIGURE 6 by the curves $a_6$, $b_6$, $c_6$, and $d_6$, respectively. That is, curves $a_6$, $b_6$, $c_6$, and $d_6$ represent the sinewave spectra of the respective camera spots that would be required to produce signals of the character that are obtained from the output terminal O of the correcting apparatus 13 of FIGURE 3 under the respective assumed conditions. It will be noted from an analysis of the respective curves of FIGURE 6 that as the number of operative amplifier channels is increased (i.e. as more of the delay line sections are effectively employed), improved achievement of one of the objectives of the correcting apparatus is realized. That is, as more amplifier contributions are employed, the magnitude of response within the boundaries of $N<n_r$ is enhanced; the level of response normally achieved at low line-numbers is maintained over a more extended range.

However, it will also be noted that achievement of the other objective of the correcting apparatus is not similarly improved but rather is worsened with an increase in the number of amplifier contributions. That is, the response at line-numbers exceeding $n_r$ increases, resulting in an increased departure from the desired cutoff at $n_r$.

Attention is now directed to curves $e_5$ of FIGURE 5, and $e_6$ of FIGURE 6, which illustrate the correcting spot sinewave spectrum, and the corrected spot sinewave spectrum under a set of assumed conditions which correspond to those assumed for curves $d_5$ and $d_6$ with the exception that the phase and magnitude relations are as follows: Amplifiers 17*c* and 17*e* again provide phase inverted output signals relative to those provided by amplifier 17*d,* but the relative adjustments of potentiometers 18*c,* 18*d* and 18*e* are such that the contributions of amplifiers 17*c* and 17*e* to the output of adder 19 are 16% of the contribution of amplifier 17*d* thereto; the outputs of amplifiers 17*b* and 17*f* are no longer in phase of the signal output of amplifier 17*d,* but rather are phase inverted with respect thereto, while the relative adjustments of potentiometers 18*b,* 18*d,* and 18*f* are such that the contributions of amplifiers 17*b* and 17*f* to the adder output are 8% of the contributions of amplifier 17*d* thereto; the outputs of amplifiers 17*a* and 17*g* are no longer phase inverted relative to the signal output of amplifier 17*d,* but rather are in phase therewith, while adjustments of potentiometers 18*a,* 18*d* and 18*g* are such that the contributions of amplifiers 17*a* and 17*g* to the output of adder 19 are 5% of the contribution of amplifier 17*d* thereto.

The results with respect to the sinewave spectrum of the corrected spot are seen to be a compromise in the achievement of the two objectives of the correcting apparatus. Thus, comparison of curve $e_6$ with the remainder of the curves of FIGURE 6 shows that improved response within the range $N<n_r$ is obtained to a degree not quite as good as that represented by curve $c_6$, but such improvement is obtained at the expense of only a little increase in the response for line-numbers beyond $n_r$.

In the preceding discussion of FIGURES 4, 5 and 6, it has been assumed that the image scanning system producing the signals sought to be corrected operates in a sequential scanning manner; that is, a scanning system in which immediately adjacent lines in a raster are scanned in immediately adjacent periods of time. It will, of course, be readily recognized that standard television broadcasting in the United States does not involve scanning systems of this type. By virtue of the FCC standards on television broadcast signals, image scanning systems of a line interlace type are required. In a line interlace system, immediately adjacent lines in a raster are not scanned in immediately adjacent periods of time; rather, every other line is scanned in succession in any given field, two successive fields being required to complete the scanning of all the raster lines. Signals derived from scanning a given raster line are immediately succeeded in time by signals derived from scanning the line following the next immediately adjacent raster line. It will next be demonstrated that, while the use of an interlace system rather than a sequential scanning system does alter the problem and the particular results achievable, it does not defeat the approach presented in the foregoing discussion. Correcting apparatus of the type shown in FIGURE 3 is still suitable for effecting the desired correction, though modifications of the polarity and magnitude adjustments are in order. As will be demonstrated in connection with FIGURES 7, 8 and 9, for which it will now be assumed that camera 11 of FIGURE 3 utilizes a "line interlace" scanning system.

Figure 7:
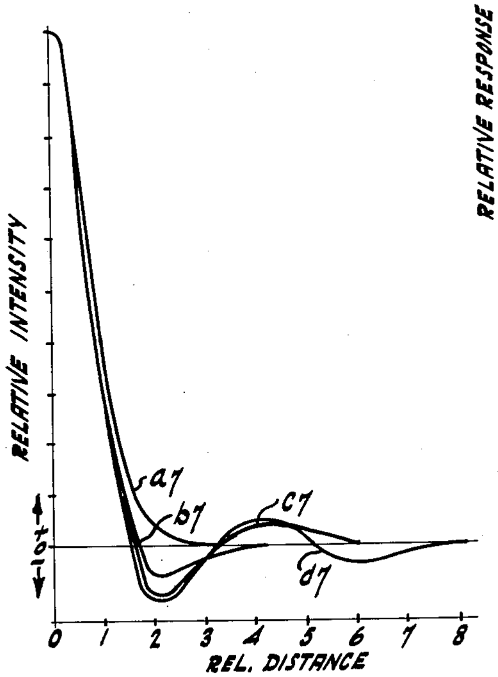
FIGURE 7 illustrates graphically the forms of corrected spots achieved by selected sets of parameter adjustments in the correcting apparatus of FIGURE 3 for signals derived in a line interlace type scanning system.

FIGURE 7 illustrates representations of the corrected spot for an interlace system in a manner similar to that employed in FIGURE 4. Curves $a_7$, $b_7$, $c_7$, and $d_7$ represent the corrected spot forms achieved in an interlace system under the same conditions assumed for curves $a_4$, $b_4$, $c_4$, and $d_4$, respectively, with the following exceptions as to the relative magnitudes of the respective amplifier contributions: For curve $b_7$, the relative adjustments of potentiometers 18*c* and 18*e* are such that the contributions of amplifiers 17*c* and 17*e* to the output of adder 19 are 7.5% of the contribution of amplifier 17*d* thereto; for curve $c_7$, the relative adjustments of potentiometers 18*b,* 18*c,* 18*d,* 18*e,* and 18*f* are such that the contributions of amplifiers 17*b* and 17*f* are 3.5% of the contribution of amplifier 17*d* thereto, while the contributions of amplifiers 17*c* and 17*e* to the adder output are 12.7% of the contribution of amplifier 17*d* thereto; for curve $d_7$, the relative adjustments of potentiometers 18*a,* 18*b,* 18*c,* 18*d,* 18*e,* 18*f,* and 18*g* are such that the contributions of amplifiers 17*a,* 17*b,* 17*c,* 17*e,* 17*f,* and 17*g* are, respectively 2.9%, 4.8%, 12.7%, 12.7%, 4.8% and 2.9% of the contribution of amplifier 17*d* thereto.

Figure 8:
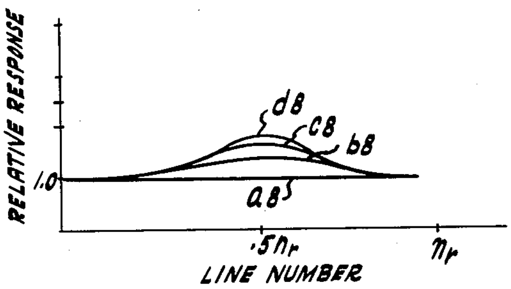
FIGURES 8 and 9 illustrate graphically the correcting spot sine-wave spectra and the corrected spot sine-wave spectra respectively, which are associated with the corrected spot forms illustrated in FIGURE 7.

The sinewave spectra for the correcting spot under the conditions assumed with respect to curves $a_7$, $b_7$, $c_7$, and $d_7$ of FIGURE 7 are represented by curves $a_8$, $b_8$, $c_8$, and $d_8$, respectively, of FIGURE 8. The resultant sinewave spectra of the corrected spot under the conditions assumed for curves $a_7$, $b_7$, $c_7$, and $d_7$ of FIGURE 7 are shown by curves $a_9$, $b_9$, $c_9$, and $d_9$, respectively, of FIGURE 9.

Figure 9:
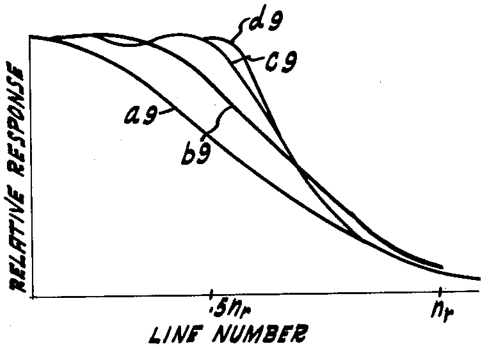

A review of the results shown by the curves of FIGURE 9 readily indicates that the correcting apparatus of FIGURE 3 is indeed capable of providing significant signal correction even where the scanning system employed is of the line interlace type. Thus, improvement of the magnitude of response within the range $N<n_r$ without departing from the objective of little or no response beyond $n_r$ is achieved though the correcting spot is formed by complying signal contributions from scanning lines nonadjacent in space. A comparison of FIGURES 8 and 5 demonstrates that the sinewave spectra of the correcting spots achievable in the interlace system differ from the correcting spot spectra achievable in the sequential scanning system in that the former peak at a line-number equal to a $.5n_r$, whereas the latter peak at a line-number equal to $n_r$. An exception to the foregoing distinction is to be noted with respect to curve $e_5$ of FIGURE 5, which peaks at a line-number equal to a $.6n_r$. It will be recalled that this spectrum form difference is the result of departing from the regular phase relationship pattern for the respective amplifier contributions in achieving curve $e_5$.

A comparison of the equivalent passband of the corrected spot and the amount of aperture correction achieved for the sequential scanning examples represented by curves $a_5$, $b_5$ etc. of FIGURE 5 and the interlace scanning system examples represented by the curves $a_9$, $b_9$ etc. of FIGURE 9, is presented below in Table I. In the second column of the table, there is presented the ratio of the equivalent passband ($N_e$) in line-numbers to the raster line-number ($n_r$) for each example. In the third column of the table, the ratio $N_e/N_{e_1}$, where $N_{e_1}$ is the equivalent passband of the uncorrected spot, is presented as a measure of the aperture correction achieved for each example.

*Table I*

| Curve | $N_e/n_r$ | $N_e/N_{e_1}$ |
|---|---|---|
| $a_5$ | .386 | 1.0 |
| $b_5$ | .612 | 1.58 |
| $c_5$ | .776 | 2.0 |
| $d_5$ | .887 | 2.3 |
| $e_5$ | .70 | 1.81 |
| $a_9$ | .386 | 1.0 |
| $b_9$ | .535 | 1.39 |
| $c_9$ | .584 | 1.51 |
| $d_9$ | .627 | 1.62 |

That the correction obtained in the interlace system does not seriously suffer in comparison with the correction obtained in the sequential system under comparable assumed conditions with respect to the correcting apparatus is demonstrated by the following examples: (1) Where only three amplifier contributions are employed, the equivalent passband for the corrected spot in the interlace system is 87% of that obtained in the sequential scanning system; (2) where five amplifier contributions are employed, the equivalent passband for the interlace example is 75% of that obtained for the sequential example; (3) where seven amplifier contributions are employed (i.e. comparing curves $d_9$ and $d_5$), the equivalent passband for the interlace example is 70% of that obtained in the sequential example. Another interesting comparison may be made between curve $c_9$ and curve $e_6$: With only five amplifier contributions, the equivalent passband in the interlace system is 83.5% of the equivalent passband obtained in the sequential system using seven amplifier contributions, but modifying the polarity relationships to avoid spurious response beyond $n_r$.

Figure 10:
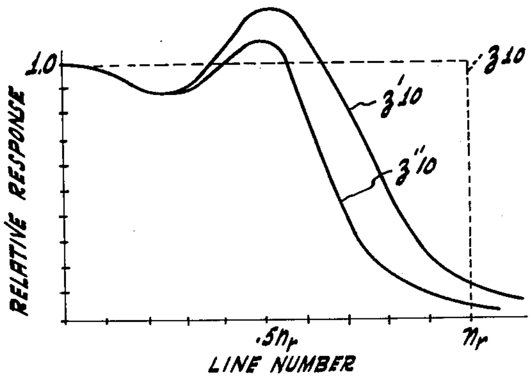
FIGURE 10 illustrates graphically corrected spot sine-wave spectra for both sequential and line interlace examples where over-correction is effected to pre-compensate for reproducer distortions.

The criterion for comparison in the examples is a "flat" frequency spectrum extending as far as possible with a given number of amplifier contributions. It should be appreciated that it is not necessary to limit the correction to this criterion, since a "wavy" spectrum does not necessarily represent poorer picture quality; one "sees" the impulse shape or its integrating value and not the spectrum itself. It may further be noted that, in practical applications of the subject correcting principles to a television system, over-correction relative to a "flat" spectrum may well be desired to provide pre-compensation for subsequent distortion to be expected in the reproducing apparatus due to the nature of the kinescope spot. Curves $z'_{10}$ and $z''_{10}$ of FIGURE 10 are illustrative of the sinewave spectra of such useful over-corrected spots, and may be compared with curve $z_{10}$, which is representative of the "ideal" flat spectrum. Curve $z'_{10}$ represents a corrected spot in a sequential scanning system, with polarity relationships of the type discussed with respect to curve $e_5$, but with altered magnitude relationships. Curve $z''_{10}$ represents a corrected spot in an interlace system under assumed conditions comparable to those assumed in connection with curve $c_9$ of FIGURE 9, but with altered magnitude relationships.

Returning to a consideration of the apparatus shown in FIGURE 3, it should be noted that in actual practice, the use of booster amplifiers in conjunction with the series of delay lines 15*a*, 15*b* etc. may likely be required at a succession of points in the delay line network to maintain a useable signal amplitude. It may be noted that the apparatus shown in FIGURE 3 employs a series of six delay lines, even though various modes of operation were contemplated and described in which a number of the amplifier channels branching off from the delay line series were rendered inoperative; it should be appreciated that the principles of the subject invention were so demonstrated for the purpose of simplicity of drawing and presentation. In actual practice, if one contemplates operation in accordance with the conditions assumed, e.g., for curve $b_5$, only two delay lines (or, alternatively, a single, center-tapped delay line) are required. A practical example of a correcting apparatus for achieving operation as exemplified by curve $b_5$ is shown in FIGURE 11.

Figure 11:
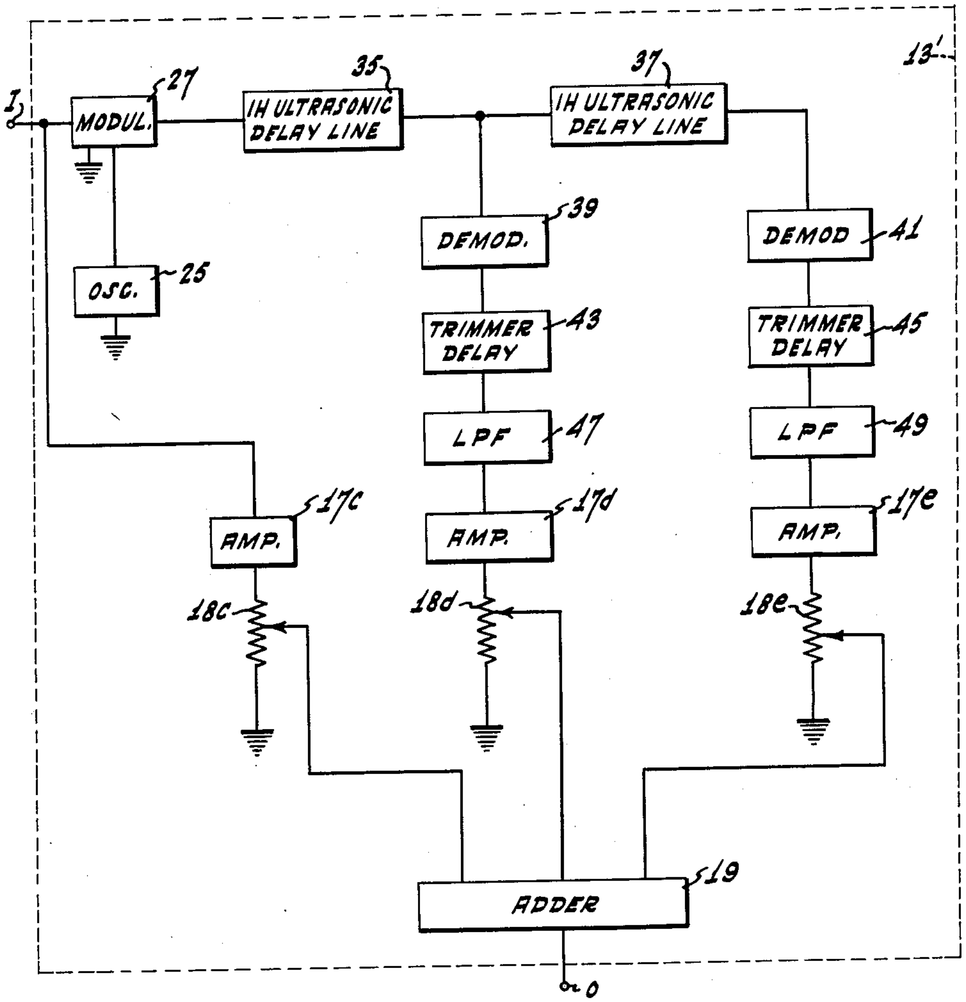
FIGURE 11 illustrates in block and schematic form a particular modification of the correcting apparatus of FIGURE 3.

In FIGURE 11, the correcting apparatus 13' utilizes two ultrasonic delay lines 35 and 37 connected in series. Each of the delay lines 35 and 37 is constructed to present a delay approximating that of a line scanning period (1H), or approximately 63.5 microseconds. Since the useable passband of commercially obtainable ultrasonic delay lines does not extend down to the lower video frequency range, the video signals to be corrected are applied to the delay line structure via modulation of a suitable carrier frequency located within the useable passband of the delay lines. To effect such operation, an oscillator 25 supplying suitable carrier frequency oscillations is coupled to a modulator 27, to which the video signals appearing at the input terminal I are also coupled. The modulator output is supplied to the input of delay line 35. The output of delay line 35 is coupled to a demodulator 39, and also to the input of the other delay line 37. The output of delay line 37 is coupled to a second demodulator 41. The outputs of demodulators 39 and 41 are applied via respective trimmer delay devices 43 and 45, and respective low pass filters 47 and 49, to respective amplifiers 17*d* and 17*e*, which correspond in function, and in relationship to the subsequent apparatus 18*d*, 18*e*, and 19 to the similarly numbered amplifiers of FIGURE 3. The input to amplifier 17*c*, also corresponding in function, and in relationship to subsequent apparatus, to the similarly numbered amplifier in FIGURE 3, is obtained directly from terminal I.

In FIGURES 3 and 11, the use of delay lines to achieve the desired signal delays has been illustrated. However, it would be readily appreciated that other types of delay devices, such as storage tubes, for example, may be substituted for the delay lines in achieving the purposes of the present invention. A particularly attractive alternative to the use of delay lines is to be found in the use of a magnetic tape recording and playback arrangement. In such an arrangement, a continuous loop, or a roll, or disc bearing a magnetizable recording medium can be used to establish the desired delays, with a succession of playback heads positioned along the route of travel, with appropriate spacing with respect to the recording head. With a suitably located erasing head, the single loop etc. can be continuously used.

In the foregoing explanation of the principles of the subject invention, it has been assumed that the camera scanning spot is of such a size (in the vertical direction) as to cause response during the scanning of a given raster line from areas of the image extending several lines above and below the nominally scanned raster line; the usual camera spot is of such a magnitude. It may be readily demonstrated that if the spot is so fine (in the vertical direction) as to cause response only from the line nominally scanned, no correction will be provided by the apparatus of the present invention. While it might appear that such a spot would permit achievement of such excellent vertical resolution that no correction would be desired anyway, it can be shown that such is not the case since the sine wave spectrum associated with such a spot would reflect excessive response above $n_r$; the spurious response, moire effects, etc. resulting from the use of such a spot would be intolerable. Accordingly, it should be noted that if the camera spot is too fine, it may be necessary to effectively enlarge it, as, for example, by means of spot wobble or focus wobble of the scanning beam, before proper correction can be achieved by the apparatus of the subject invention. It may be of interest to note that achievement of the "ideal" flat spectrum illustrated by curve $z_{10}$ of FIGURE 10 would require that the original camera spot be of such a size that some response is obtained from all lines of the scanning raster when nominally scanning any predetermined scanning line; achievement of such an ideal characteristic would also require that the correcting apparatus incorporate several hundred delay devices.

I claim:

1. In combination with a source of video signals derived in accordance with a scanning system of the type wherein the scanning lines of successive fields are coincident, a vertical aperture corrector comprising the combination of first, second, third and fourth delay devices connected in series in the order named between said source and a terminating impedance, each delay device having an input terminal and an output terminal and each providing between its input terminal and its output terminal a delay substantially equal to a line period in said scanning system, signal combining means, means for applying signals derived from the output of said second delay device to said signal combining means, means for applying signals derived from the output terminals of said first delay device and said third delay device to said signal combining means in phase opposition and with reduced amplitude relative to the signals applied thereto from the output of said second delay device, means for applying signals derived from the input terminal of said first delay device and the output terminal of said fourth delay device to said signal combining means in phase opposition and with reduced amplitude relative to the signals applied thereto from the output terminal of said second delay device, and means for deriving a corrected video signal output from said signal combining means.

2. Apparatus in accordance with claim 1 wherein said corrector additionally includes fifth and sixth delay devices, each having an input terminal and an output terminal and providing a delay between said input terminal and said output terminal substantially equal to a line period in said scanning system, said fifth delay device being interposed between said source and said first delay device, the input terminal of said fifth delay device being coupled to said source and the output terminal of said fifth delay device being coupled to the input terminal of said first delay device, said sixth delay device being interposed between said fourth delay device and said terminating impedance, the input terminal of said sixth delay device being coupled to the output terminal of said fourth delay device and the output terminal of said sixth delay device being coupled to the terminating impedance, and means for applying signals derived from the input terminal of said fifth delay device and the output terminal of said sixth delay device to said signal combining means in the same phase but reduced in amplitude relative to the signals applied thereto from the output of said second delay device.

3. In combination with a source of video signals representative of an image in terms of successive fields of horizontal scanning lines, vertical aperture correction apparatus comprising the combination of signal delay means having an input terminal, an output terminal, and a plurality of intermediate terminals, the total delay provided by said signal delay means between said input terminal and said output terminal being at least an order of magnitude less than the duration of the field of lines and being substantially equal to an even integral multiple of a line period, said intermediate terminals being equally spaced, in terms of delay, with respect to each other and to said input and said output terminals, the spacing between successive terminals being substantially equal, in terms of delay, to a line period, one of said intermediate terminals being centrally located with respect to said input and output terminals; means for applying video signals from said source to said input terminal; an adder; means for applying signals from said centrally located terminal to said adder; means for applying signals from the pair of intermediate terminals immediately adjacent to said centrally located terminal to said adder, the signals from said pair of immediately adjacent intermediate terminals being applied to said adder with inverted phase and reduced amplitude relative to the signals applied thereto from said centrally located terminal; means for utilizing the corrected video signal output of said adder; and means for additionally applying signals from the remaining terminals of said delay means to said adder, the signals from said remaining terminals being applied to said adder with phase and reduced amplitude relationships chosen relative to the signals applied thereto from said centrally located terminal and said immediately adjacent terminals so as to provide said corrected video signal output with a vertical sine wave response significantly enhanced for frequencies corresponding to line-numbers in the vicinity of but lower than the raster line-number but insignificantly enhanced for frequencies corresponding to line-numbers higher than the raster line-number, whereby a correction of said video signals is effected which serves to improve the vertical resolution of an image reproduction utilizing the video signals without increasing response to spurious signals.

4. A combination in accordance with claim 3 wherein the video signals provided by said source are derived by a sequential scanning system whereby the scanning lines of successive fields are coincident, and wherein said means for additionally applying signals from the remaining terminals of said delay means comprises means for applying signals from the intermediate terminals next adjacent to said pair of immediately adjacent intermediate terminals to said adder with inverted phase and reduced amplitude relative to the signals applied thereto to said centrally located terminal, and means for applying signals from said input terminal and from said output terminal to said adder in the same phase as, but with reduced amplitude relative to, the signals applied thereto from said centrally located terminal.

References Cited in the file of this patent

UNITED STATES PATENTS

| | | |
|---|---|---|
| 2,263,376 | Blumlein | Nov. 18, 1941 |
| 2,273,163 | Wilson | Feb. 17, 1942 |
| 2,757,236 | Bedford | July 31, 1956 |
| 2,759,044 | Oliver | Aug. 14, 1956 |
| 2,922,965 | Harrison | Jan. 26, 1960 |